US008415920B2

(12) United States Patent
Liao

(10) Patent No.: US 8,415,920 B2
(45) Date of Patent: Apr. 9, 2013

(54) CHARGER AND A COMBINATION STRUCTURE

(76) Inventor: Sheng-Hsin Liao, Shulin (TW)

(*) Notice: Subject to any disclaimer, the term of this patent is extended or adjusted under 35 U.S.C. 154(b) by 441 days.

(21) Appl. No.: 12/485,204

(22) Filed: Jun. 16, 2009

(65) Prior Publication Data

US 2010/0315036 A1 Dec. 16, 2010

(51) Int. Cl.
*H02J 7/00* (2006.01)

(52) U.S. Cl. ........ 320/111; 320/112; 320/114; 439/134; 439/174; 16/225; 16/226; 248/906

(58) Field of Classification Search .......... 320/111–114; 439/134, 174; 16/225, 226; 248/906
See application file for complete search history.

(56) References Cited

U.S. PATENT DOCUMENTS

| 4,181,250 | A  | * | 1/1980 | Withrow ..................... 232/44 |
| 5,762,512 | A  | * | 6/1998 | Trant et al. .................. 439/347 |
| 5,998,964 | A  | * | 12/1999 | Martensson ................. 320/111 |
| 6,510,067 | B1 | * | 1/2003 | Toebes ......................... 363/146 |
| 6,861,822 | B2 | * | 3/2005 | Wei .............................. 320/111 |
| 7,213,860 | B2 | * | 5/2007 | Brenneman et al. ......... 296/61 |
| 2002/0022496 | A1 | * | 2/2002 | Park ............................. 455/550 |

* cited by examiner

*Primary Examiner* — Samuel Berhanu
(74) *Attorney, Agent, or Firm* — C. G. Mersereau; Nikolai & Mersereau, P.A.

(57) ABSTRACT

A charger has its one side provided with terminals. The charger is provided with a connector. The terminals and the connector are electrically connected with a charging circuit within the charger. The charger has a panel connecting piece for connecting to a socket panel. The present invention further provides a combination of a charger and a socket panel. The charger is combined with the socket panel, so that the user can use the charger easily. The problem that the user may not find the charger is eliminated.

12 Claims, 15 Drawing Sheets

CHARGER AND A COMBINATION STRUCTURE

BACKGROUND OF THE INVENTION

1. Field of the Invention

The present invention relates to a charger, and in particular, to combination of the charger provided on a socket panel and the socket panel thereof.

2. Description of Related Art

Usually, public power cables are embedded within the walls of a room. Via the sockets provided on the walls, the public power cables or signal lines can be connected. When the power of an electronic product (such as mobile phone, digital camera, PDA, or other portable electronic product) is exhausted, it has to be connected to public power to supplement electricity so as to maintain its normal operation. When the electronic product has to be connected to the Internet to transmit data, the user can connect the electronic product to the socket via a transmission line and a plug. In this way, the electronic product can be connected to the public power or a signal line, thereby obtaining the electricity or network signals.

A common portable electronic product is provided with a rechargeable battery (such as Li battery, Ni—H battery, or Ni—Cd battery). Via a charger, the rechargeable battery can be charged. The charger is inserted into the socket. The charging circuit within the charger can convert the public power into a DC power, thereby providing necessary power for the portable electronic device.

However, the conventional socket is not provided with a charger. As a result, when a portable electronic product needs to be charged, the user has to find a charger first, which causes inconvenience in use. Especially, sometimes the user may not find a charger.

SUMMARY OF THE INVENTION

The objective of the present invention is to provide a charger and a combination of the charger and a socket panel. The charger can be combined with the socket panel, so that it is convenient to use the charger. Thus, the problem that the user may not find a charger is eliminated.

To achieve the above-mentioned objective, the present invention provides a charger. One side of the charger is provided with terminals. The charger is provided with at least one connector. The terminals and connector are electrically connected with a charging circuit within the charger. The charger has a panel connecting piece.

To achieve the above-mentioned objective, the present invention provides a combination of a charger and a socket panel, which includes: a socket panel; and a charger. One side of the charger is provided with terminals. The charger is provided with at least one connector. The terminals and connector are electrically connected with a charging circuit within the charger. The charger has a panel connecting piece. The panel connecting piece is connected to the socket panel.

The present invention has advantageous features as follows. The charger according to the present invention can be combined with the socket panel. Thus, it is very convenient to use the charger, and the problem that the user may not find the charger is eliminated.

The present invention can be further provided with a connecting line and an electrical connector. By means of providing the connecting line and the electrical connector rapidly, it is convenient for the user to connect to an electronic product. Further, when the connecting line and the electrical connector are not used, they can be stored in the socket body without becoming disordered.

The present invention is further provided with a supporting plate for supporting an electronic product.

In order to further understand the characteristics and technical contents of the present invention, a description relating thereto will be made with reference to the accompanying drawings. However, the drawings are illustrative only and are not used for limiting the present invention.

DETAILED DESCRIPTION OF THE PREFERRED EMBODIMENTS

Figure 1:
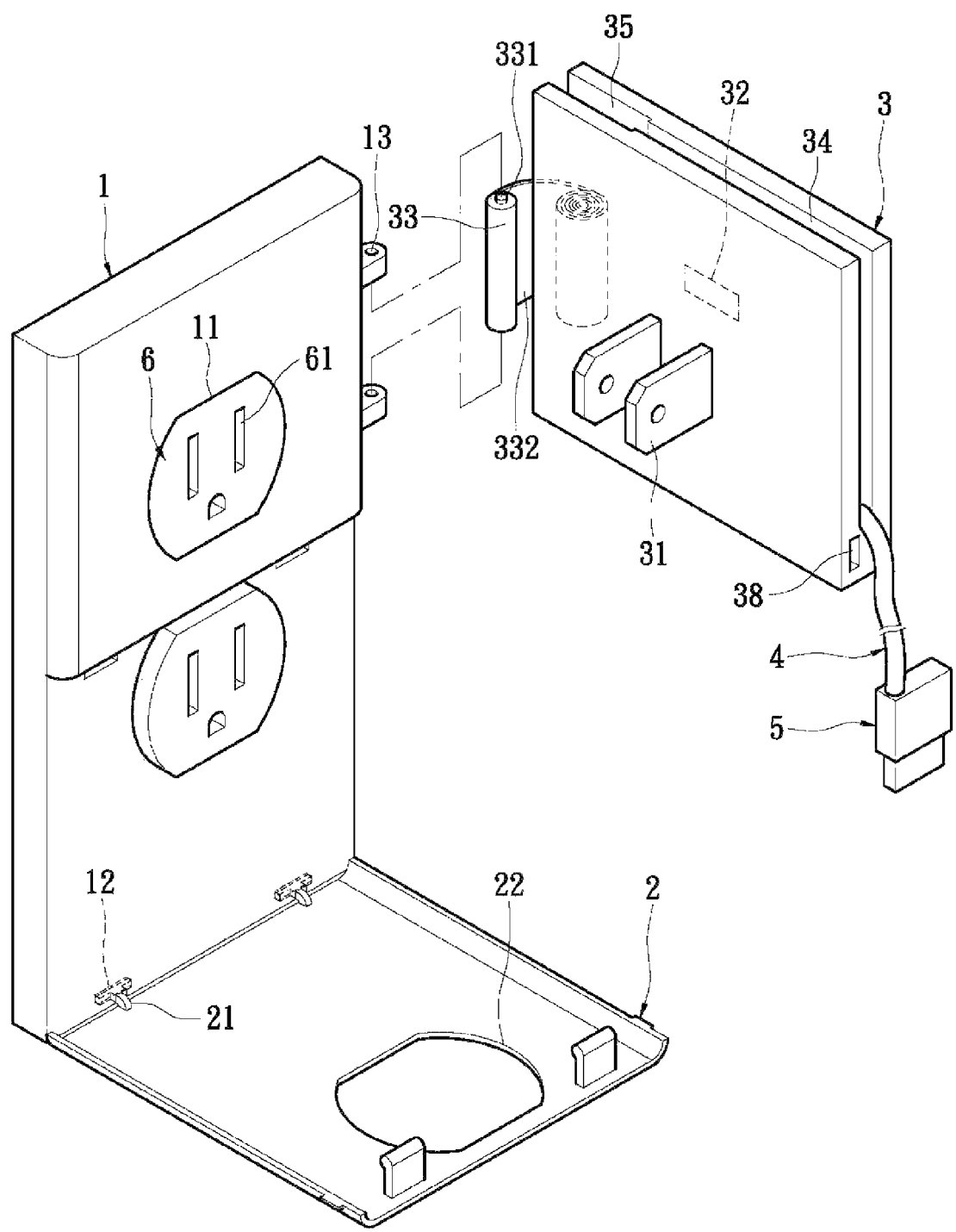
FIG. 1 is an exploded perspective view showing the combination of a charger and a socket panel according to the first embodiment of the present invention.
Figure 2:
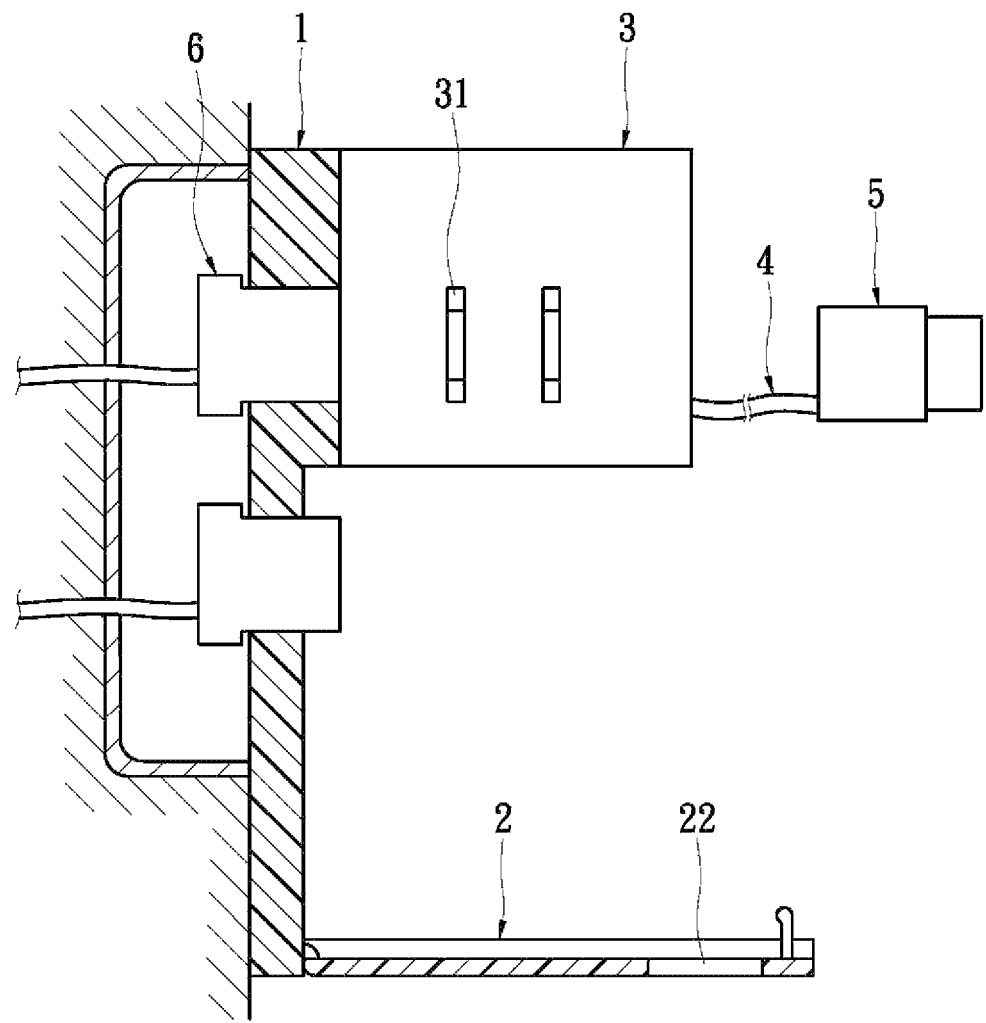
FIG. 2 is a cross-sectional view showing the combination of the charger and the socket panel according to the first embodiment of the present invention.
Figure 3:
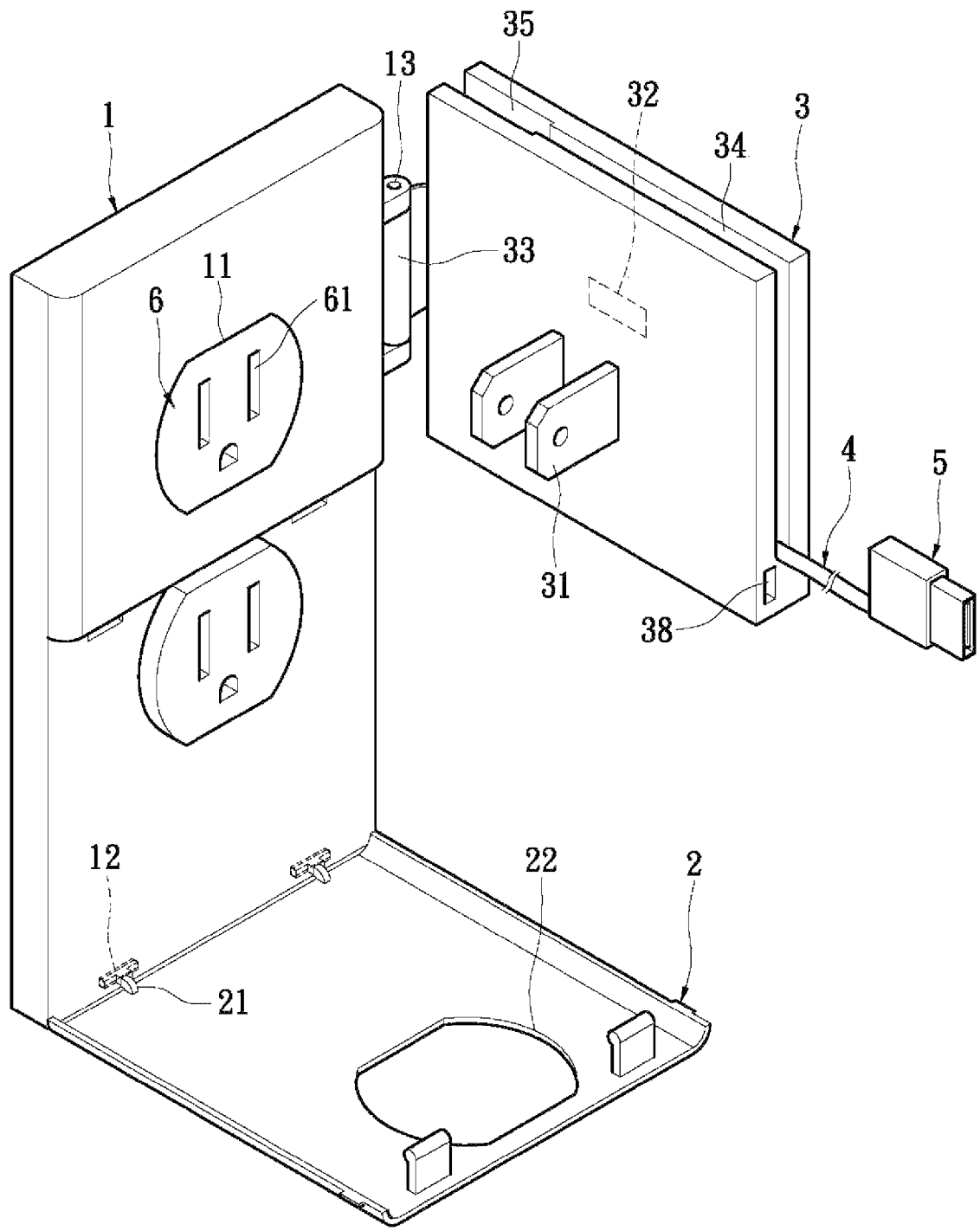
FIG. 3 is a perspective view showing the combination of the charger and the socket panel according to the first embodiment of the present invention.

Please refer to FIGS. 1 to 3, which show the combination structure according to the first embodiment of the present invention. The combination structure adapted to house a socket unit includes a socket panel 1, a supporting plate 2, a charger 3, a connecting line 4, and an electrical connector 5.

The socket panel 1 is a square plate. However, the shape and dimensions of the socket panel 1 are not limited thereto and can be varied suitably based on practical demands. The socket panel 1 can be constituted of single or multiple layers of plates. The socket plate 1 configured to exposingly house the socket unit 6 is provided with at least one engaging portion 11. The engaging portion 11 is a through-hole corresponding to the socket unit 6, so that the engaging portion 11 can be engaged with the outer edge of the socket unit 6. The bottom side of the socket panel 1 is provided with two juxtaposed first pivoting portions 12. The two first pivoting portions 12 are pivot holes. In the present embodiment, the socket unit 6 is engaged with the engaging portion 11 of the socket panel 1. The socket unit 6 has at least one set of insertion holes 61. The specification and form of the socket unit 6 are not limited thereto and can be various kinds of insertion holes or electrical connectors.

The supporting plate 2 is located on the front side of the socket panel 1. One side of the supporting plate 2 is provided with two second pivoting portions 21. Both of the second pivoting portions 21 are pivot shafts. Both of the second pivoting portions 21 on one side of the supporting plate 2 are pivoted to the two first pivoting portions 12 on the bottom side of the socket panel 1, so that the supporting plate 2 can be connected to the socket panel 1. The supporting plate 2 can be flipped downwards to the horizontal position for allowing an electronic product to be disposed thereon. The supporting plate 2 can be flipped upwards to be overlapped on the front side of the socket panel 1. The supporting plate 2 is provided with an open hole 22 corresponding to the socket unit 6. When the supporting plate 2 is overlapped on the front side of the socket panel 1, the insertion hole 61 of the socket unit 6 can be exposed to the outside via the open hole 22, so that the insertion holes 61 of the socket unit 6 may be used easily.

The charger 3 is a charging device in which a charging circuit (not shown) is provided. The charging circuit is of a conventional art and thus the description thereof is omitted hereinafter. The rear side of the charger 3 is provided with terminals 31 corresponding to the insertion holes 61 of the socket unit 6, that is to say, the charger 3 has an inner surface having terminals 31 electrically connectable and engageable with the socket unit 6. The terminals 31 can be fixed or foldable. If the terminals 31 are foldable, the charger 3 can be carried easily with the terminals folded. The front side or edge of the charger 3 is provided with at least one connector 32. The connector 32 can be a USB connector, IEEE1394 connector, HDMI connector, or various connectors for AV terminals or DC terminals. The terminals 31 and the connector 32 are electrically connected with the charging circuit within the charger 3. One edge of the charger 3 has a panel connecting piece 33. In the present embodiment, the panel connecting piece 33 is a pivot shaft and a spring. The panel connecting piece 33 has a leaf spring 332 that can be wound and unwound elastically, that is to say, the leaf spring 332 equals to a laminated spring that is rollable. One end of the leaf spring 332 is fixed to the charger 3, and the other end of the leaf spring 332 is exposed out of the charger 3. The top and bottom of the other end of the leaf spring 332 are provided with a shaft 331 respectively. One side of the socket panel 1 is provided with pivot holes 13 corresponding to the two shafts 331. The two shafts 331 are pivoted to the two pivot holes 13 to form a pivot structure, whereby the charger 3 can be pivoted to one side of the socket panel 1 and the pivoting portion of the panel connecting piece 33 is pivotably connected to an edge portion of the socket panel 1, whereby when the charger 3 is used, the reeled portion of the panel connecting piece 33 allows extension of the extending portion for increasing the distance between the edge portion of the charger 3 and the edge of the wall socket unit, and the terminals 31 of the charger 3 are inserted into the socket unit 6 by pivoting the pivoting portion of the panel connecting piece 33, and when the socket unit 6 is used, the reeled portion of the panel connecting piece 33 allows extension of the extending portion for increasing the distance between the edge portion of the charger 3 and the edge of the wall socket unit, and the terminals 31 of the charger 3 are separated from the socket unit 6 by pivoting the pivoting portion of the panel connecting piece 33. The edge of the charger 3 is provided with a cable trough 34 and an accommodating trough 35. The accommodating trough 35 is connected to one end of the cable trough 34. The accommodating trough 35 is in communication with the cable trough 34, so that the connecting line 4 and the electrical connector 5 can be stored in the cable trough 34 and the accommodating trough 35 of the charger 3. In the present embodiment, the edge of the charger 3 is provided with another connector 38. The connector 38 is electrically connected with the charging circuit within the charger 3. In other words, the panel connecting piece 33 is woundable elastically and has a reeled portion, a pivoting portion, and an extending portion connected between the reeled portion and the pivoting portion. The reeled portion is arranged in the edge portion of the charger 3, the pivoting portion is arranged outside the charger 3, and the extending portion is arranged at least partially outside the charger 3.

When the user intends to use the charger 3, the user flips the charger 3 with respect to the socket panel 1 and selectively inserts the charger 3 into the insertion holes 61 of the socket unit 6, so that the terminals 31 of the charger 3 are brought into contact and electrical connection with the terminals (not shown) in the insertion holes 61. In this way, the electricity can be delivered to the charger 3, so that the connectors 32, 38 of the charger 3 can be used to charge the electronic product. The charger 3 of the present invention can be combined with the socket panel 1. Thus, it is very convenient to use the charger 3, and the problem that the user may not find the charger is eliminated. When the charger 3 is not in use, it can be removed from the insertion holes 61 of the socket unit 6 without hindering the usage of the insertion holes 61 of the socket unit 6.

The connecting line 4 is a cable constituted of an internal conductor and an external insulating layer covering the outside of the conductor. However, the construction and form of the connecting line 4 are not limited thereto. The connecting line 4 can be various kinds of cables or flat cables. One end of the connecting line 4 extends into the charger 3 and is electrically connected with the charging circuit within the charger 3 or other electronic device. The connecting line 4 is selectively wound around the edge of the charger 3. That is, the connecting line 4 can be wound in the cable trough 34 at the edge of the charger 3. Via this arrangement, when the connecting line 4 is not in use, it can be fixed in the cable trough 34 suitably. On the other hand, when in use, the connecting line 4 can be pulled out of the cable trough 34.

The electrical connector 5 can be a USB connector, IEEE1394 connector, HDMI connector, and various kinds of electrical connectors for AV terminals or DC terminals. The electrical connector 5 may be a female-type or male-type connector. The specification and form of the electrical connector 5 are not limited thereto. The electrical connector 5 is connected to the other end of the connecting line 4. The interior of the electrical connector 5 is provided with a plurality of terminals (not shown). The terminals are made of materials having good electrical conductivity. The terminals are electrically connected to the conductor within the connecting line 4, so that the electrical connector 5 can be electrically connected to the connecting line 4. When the connecting line 4 is wound in the cable trough 34 at the edge of the charger 3, the electrical connector 5 can be received in the corresponding accommodating trough 35.

Figure 4:
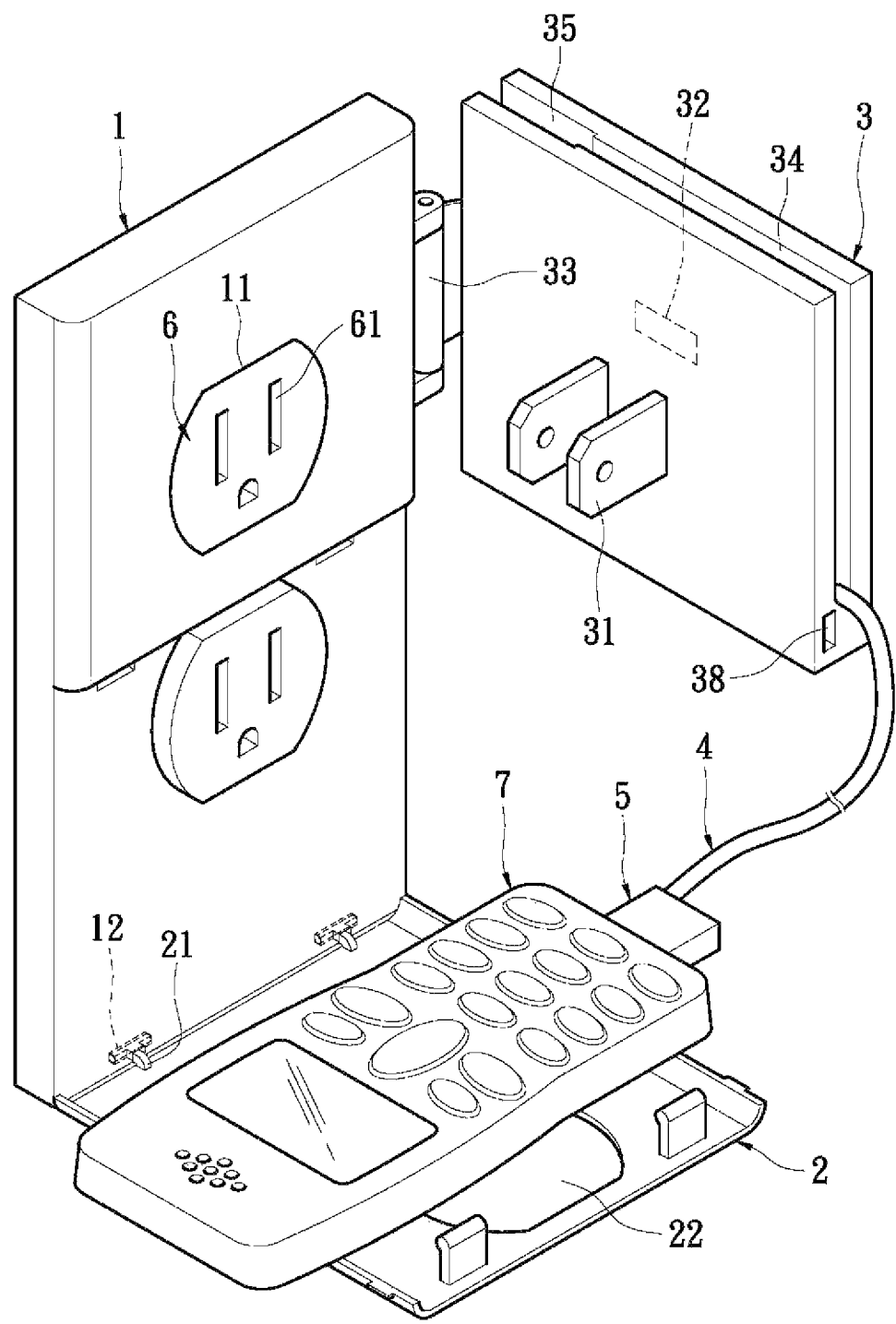
FIG. 4 is a perspective view showing an operating state of the combination of the charger and the socket panel according to the first embodiment of the present invention.

As shown in FIG. 4, the user first flips the supporting plate 2 with respect to the socket panel 1 to locate the supporting plate 2 in a horizontal position. Then, the electronic product 7 is disposed on the supporting plate 2. Via this arrangement, the electronic product 7 can be disposed firmly and stably during the charging period and while under electrical connection with the connecting line 4, the electrical connector 5, or the connectors 32, 38. The supporting plate 2 can be also omitted, so that the electronic product 7 has to be disposed on other suitable positions.

The present invention is combined with the connecting line 4 and the electrical connector 5. Also, the connecting line 4 and the electrical connector 5 are movably provided on the charger 3. When the user needs to use the connecting line 4 and the electrical connector 5, the user just needs to pull the connecting line 4 and the electrical connector 5 out of the cable trough 34 and the accommodating trough 35 of the charger 3. Thus, the connecting line 4 and the electrical connector 5 can be used quickly and easily without taking too much time to find them. When the connecting line 4 and the electrical connector 5 are not in use, they need not be removed, but may simply be stored in the cable trough 34 and the accommodating trough 35 of the charger 3. Therefore, the connecting line 4 and the electrical connector 5 will not be lost and can be used easily later. Further, the connecting line 4 and the electrical connector 5 are stored orderly without hindering the usage of the socket.

The interior of the charger 3 can be further provided with a detector for detecting a moving object. The interior of the charger 3 is further provided with a small night lamp for illuminating at night.

Figure 5:
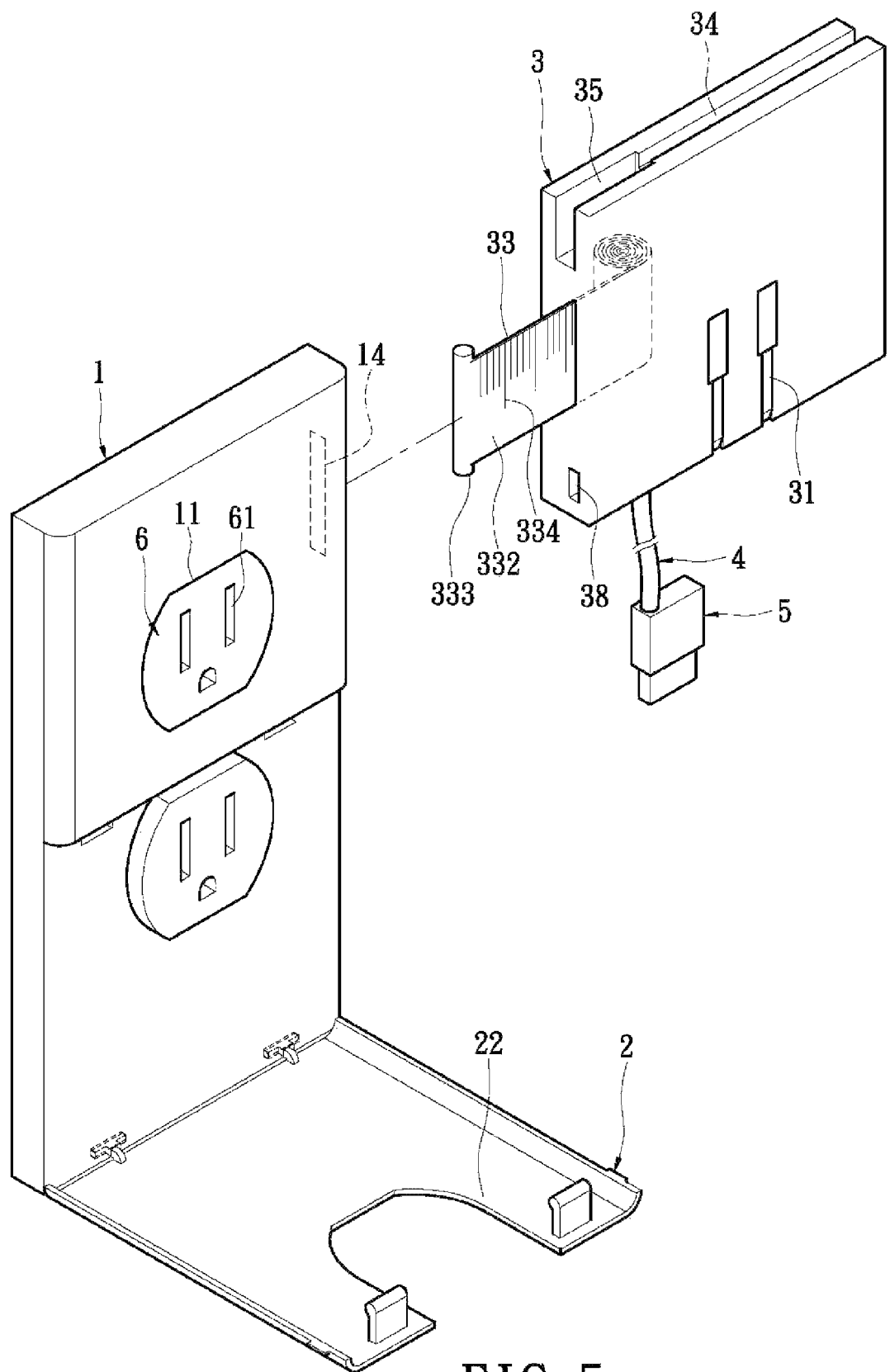
FIG. 5 is an exploded perspective view showing the combination of a charger and a socket panel according to the second embodiment of the present invention.

Please refer to FIG. 5. In the second embodiment of the present invention, the panel connecting piece 33 has a leaf spring 332 that can be wound or unwound elastically. One end of the leaf spring 332 is fixed to the charger 3, and the other end of the leaf spring 332 is formed with a shaft 333. One side of the socket panel 1 is provided with a connecting hole 14. The shaft 333 is pivoted to the connecting hole 14, thereby forming a pivot structure. Via this arrangement, the charger 3 can be pivoted to and flipped over one side of the socket panel 1. Thus, the charger 3 can be extended outwards via the leaf spring. The shaft 333 and the connecting hole 14 can be detached; therefore the charger 3 can be separated from the socket panel 1 so that the charger 3 may be taken away separately. The leaf spring 332 can be provided with graduations 334, so that the charger 3 can be used as a tape measure after being detached from the socket panel 1. The terminals 31 can be folded. In the present embodiment, the panel connecting piece 33 serves as a pivot and a leaf spring. However, the structure of the panel connecting piece 33 is not limited. As long as the charger 3 is connected to the socket panel 1, the panel connecting piece 33 can be a pivot or a leaf spring.

Figure 6:
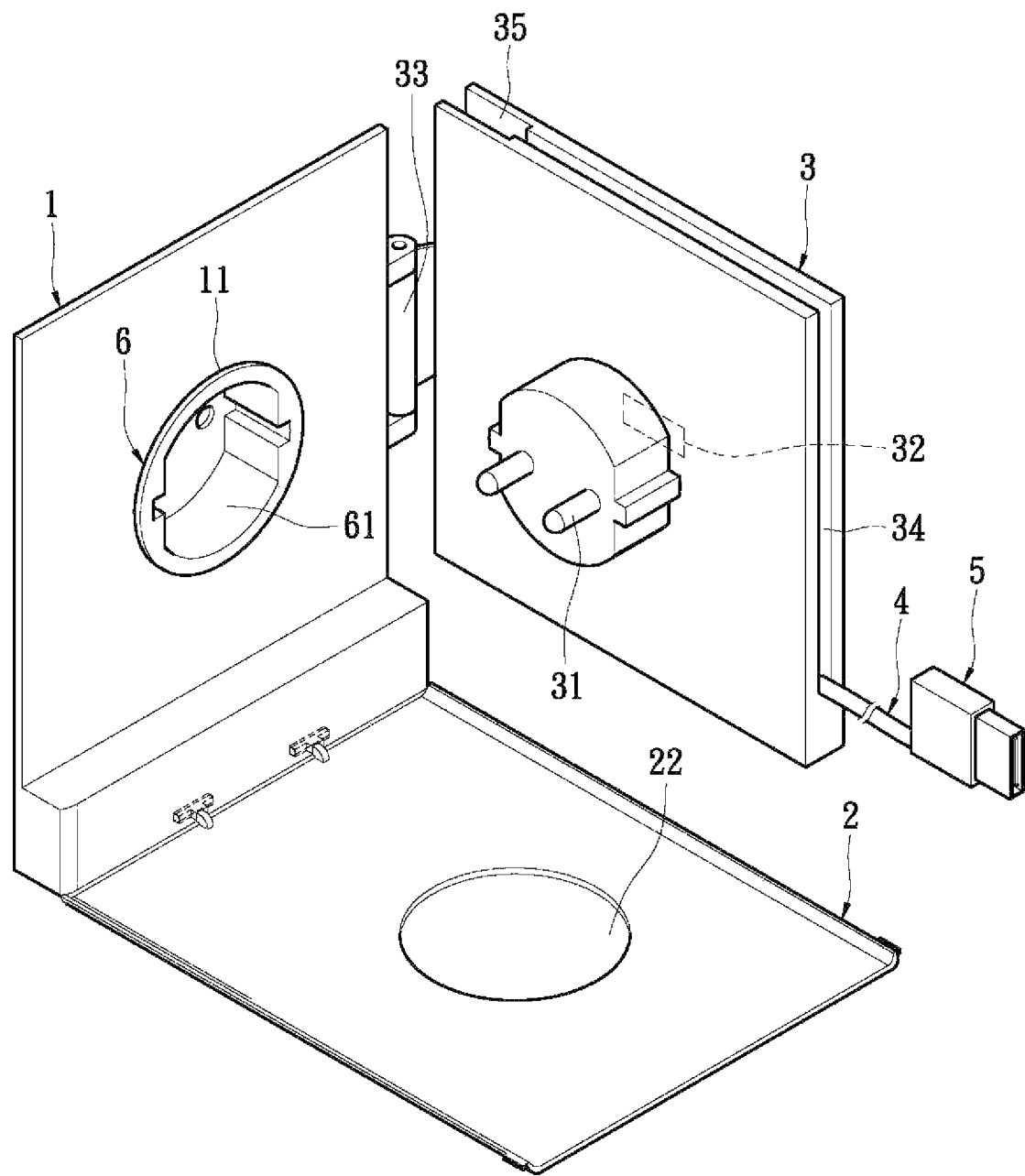
FIG. 6 is a perspective view showing the combination of a charger and a socket panel according to the third embodiment of the present invention.

Please refer to FIG. 6. In the third embodiment of the present invention, the shapes of the socket panel 1 and the charger 3 are varied. Further, the socket unit 6 conforms to the European standard.

Figure 7:
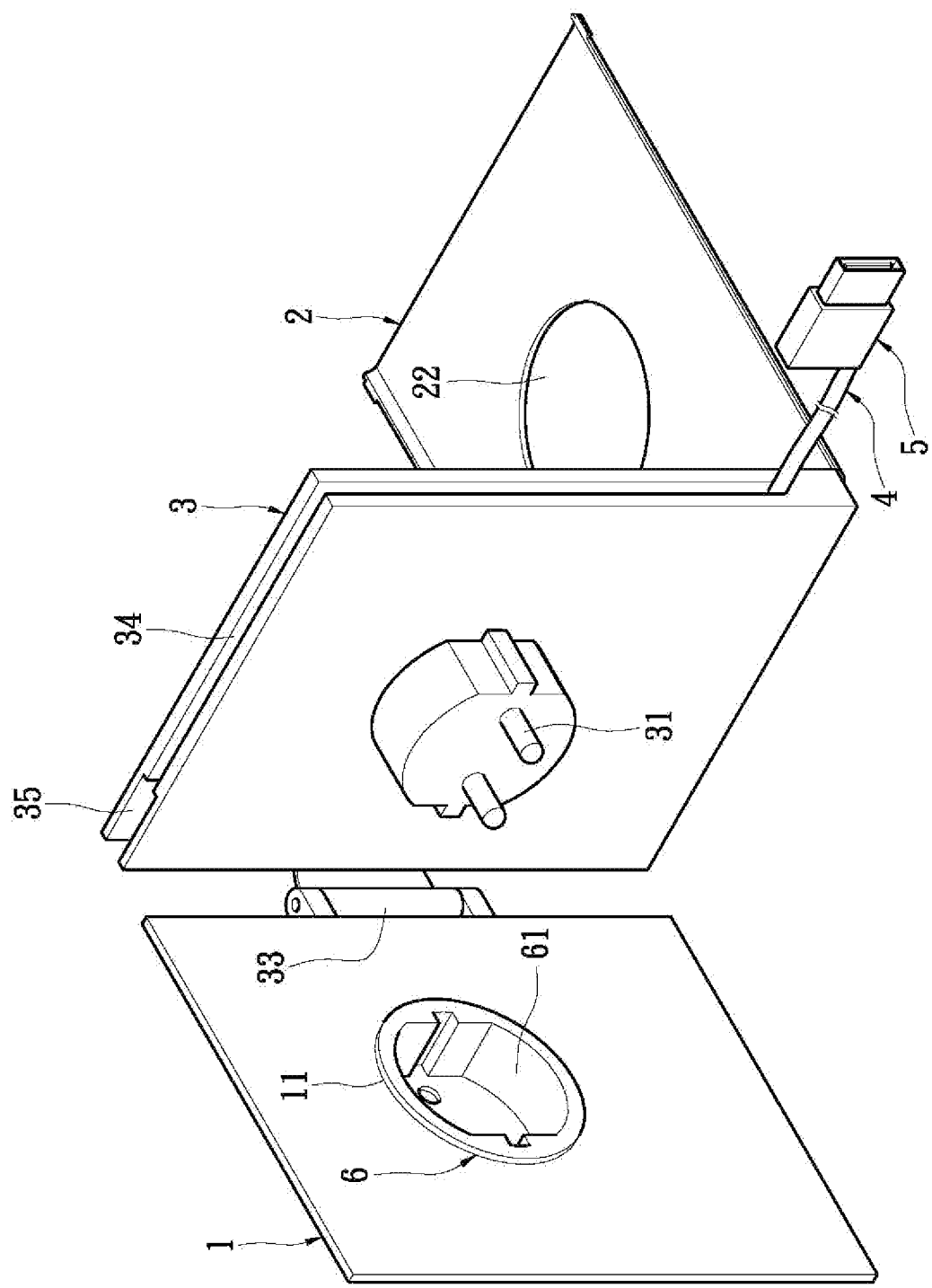
FIG. 7 is a perspective view showing the combination of a charger and a socket panel according to the fourth embodiment of the present invention.

Please refer to FIG. 7. In the fourth embodiment of the present invention, the supporting plate 2 is located on the front side of the charger 3. One side of the supporting plate 2 is pivoted to the bottom side of the charger 3, so that the supporting plate 2 can be connected to and flipped over the charger 3. The supporting plate 2 can be flipped downwards to the horizontal position for allowing an electronic product to be disposed thereon. The supporting plate 2 can be flipped upwards to be overlapped on the front side of the charger 3.

Figure 8:
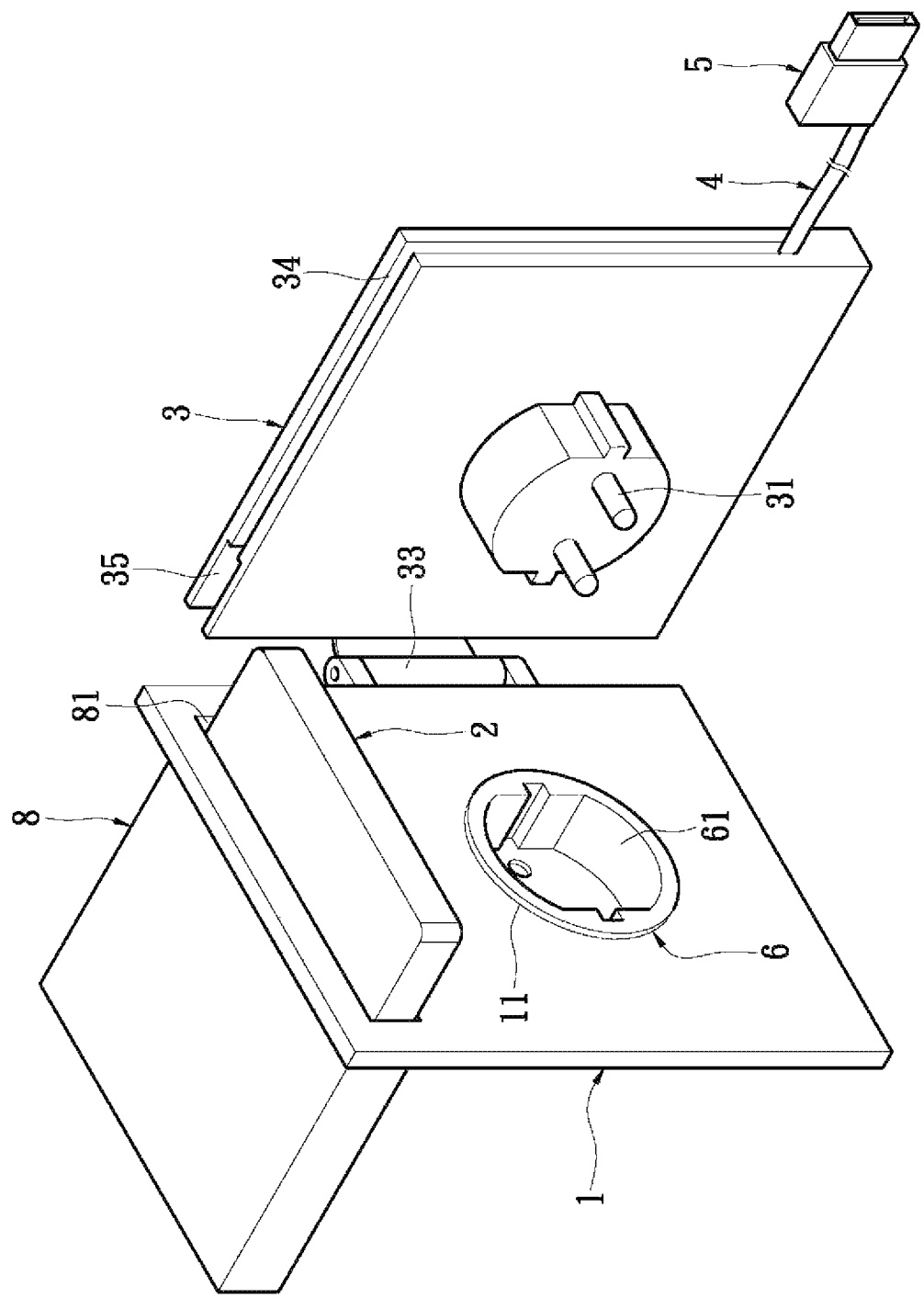
FIG. 8 is a perspective view showing the combination of a charger and a socket panel according to the fifth embodiment of the present invention.
Figure 15:
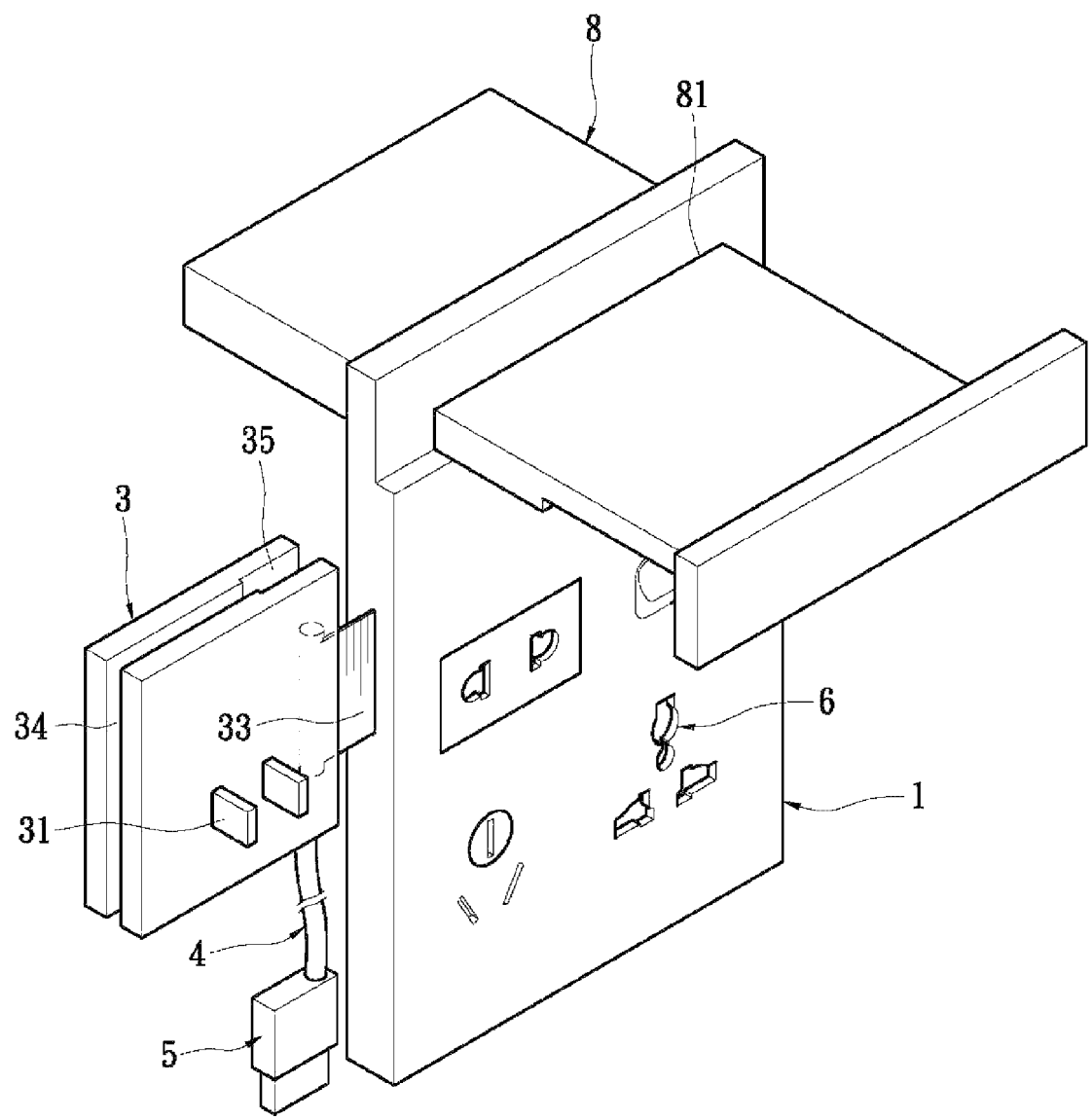
FIG. 15 is a perspective view showing the combination of a charger and a socket panel according to the twelfth embodiment of the present invention.

Please refer to FIG. 8 and FIG. 15. In the fifth and twelfth embodiments of the present invention, an accommodating box 8 is provided. The front side of the accommodating box 8 is provided with an opening 81. The accommodating box 8 is disposed on the rear side of the socket panel 1. The supporting plate 2 is located on the opening 81 of the accommodating box 8, so that the supporting plate 2 can slide forwards and rearwards through the opening 81. The user can pull the supporting plate 2 out of the accommodating box 8 via the opening 81. In this way, the electronic product can be disposed on the supporting plate 2.

Figure 9:
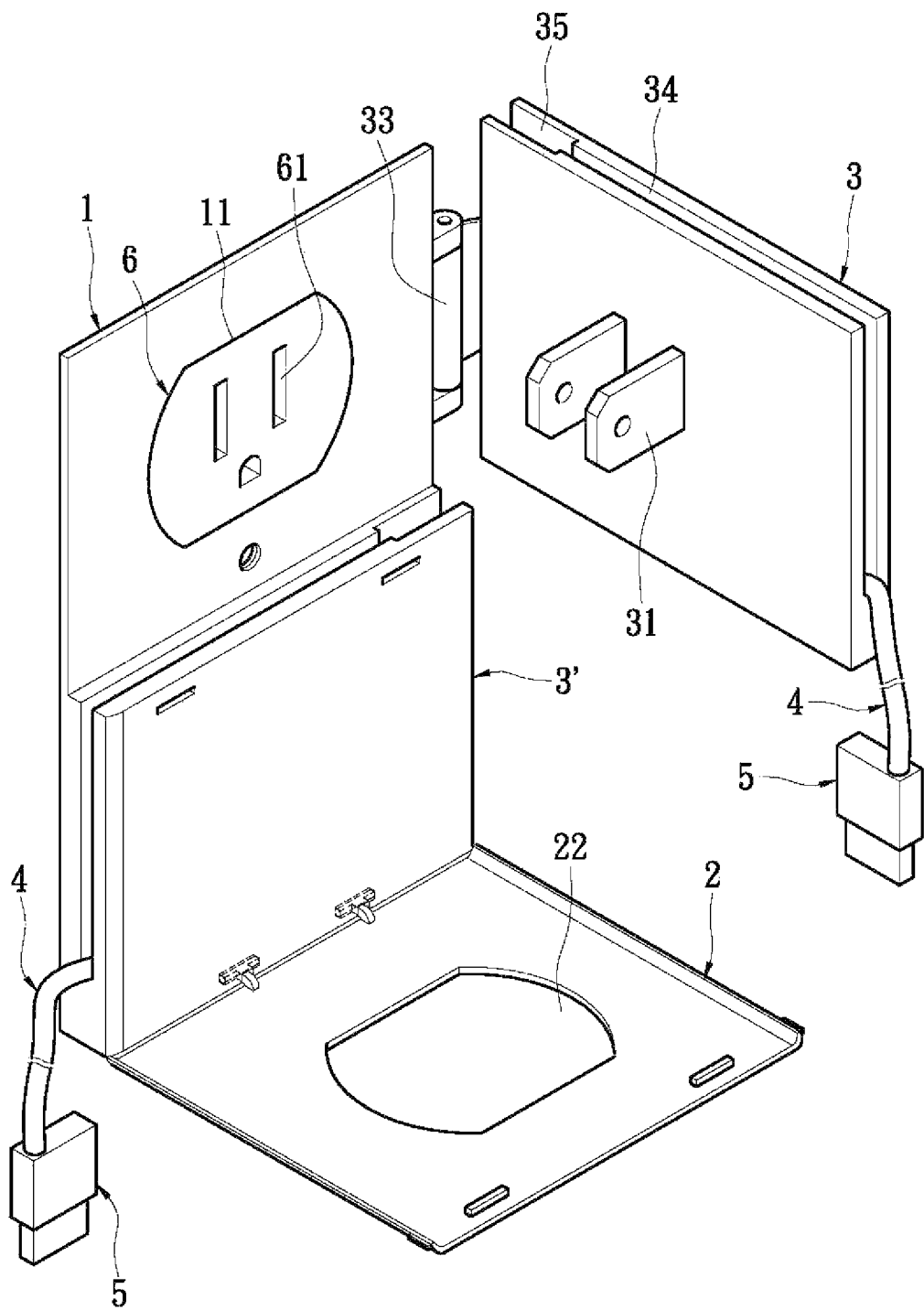
FIG. 9 is a perspective view showing the combination of a charger and a socket panel according to the sixth embodiment of the present invention.
Figure 10:
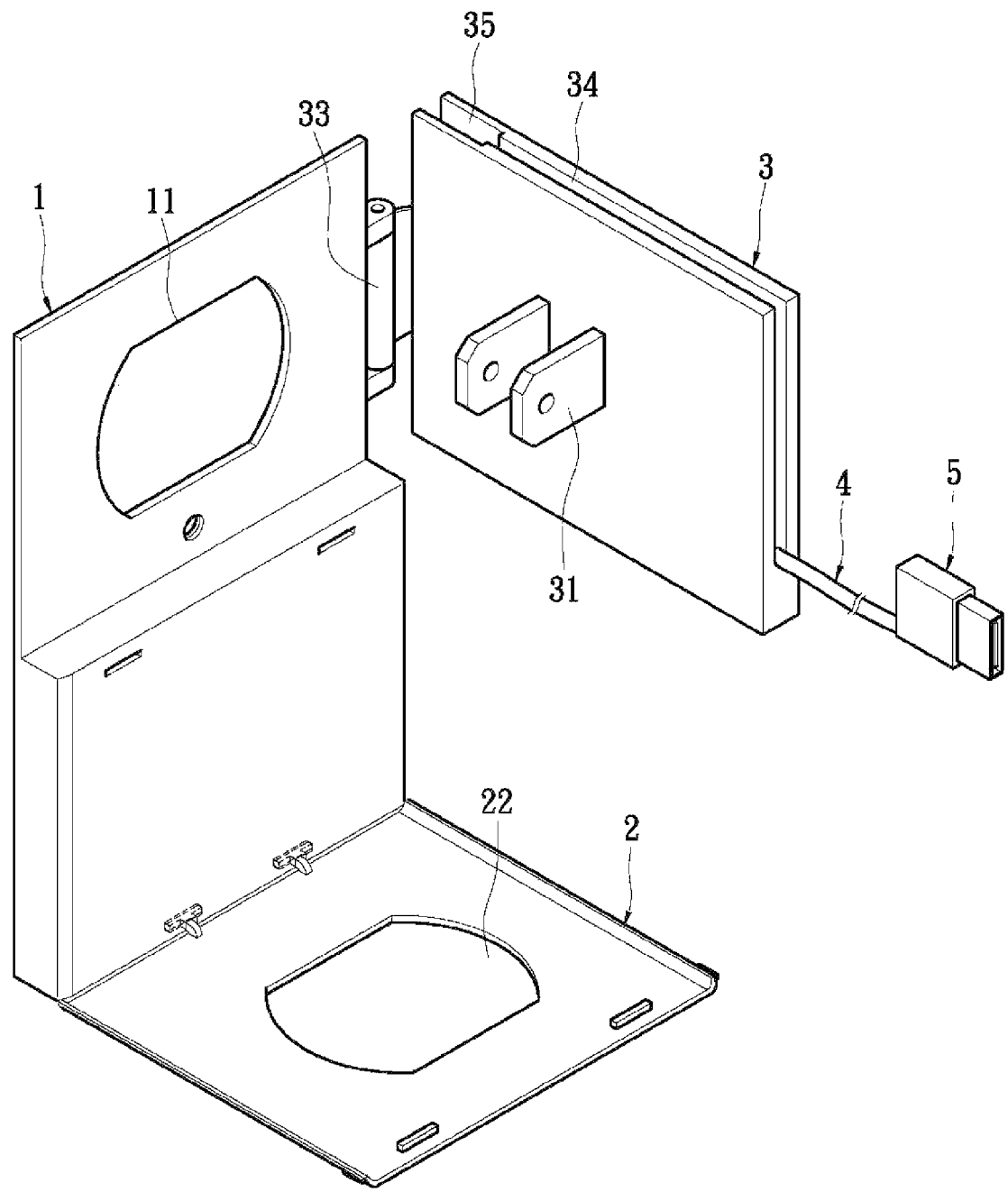
FIG. 10 is a perspective view showing the combination of a charger and a socket panel according to the seventh embodiment of the present invention.

Please refer to FIG. 9. In the sixth embodiment of the present invention, the construction of the socket panel 1 can be varied suitably. The socket panel 1 is also connected with a connecting line 4 and an electrical connector 5. One end of the connecting line 4 extends into the socket panel 1. The electrical connector 5 is connected to the other end of the connecting line 4. The connecting line 4 is selectively wound around the edge of the socket panel 1. Please refer to FIG. 10. In the seventh embodiment of the present invention, the socket panel 1 is not combined with the socket unit 6.

Figure 11:
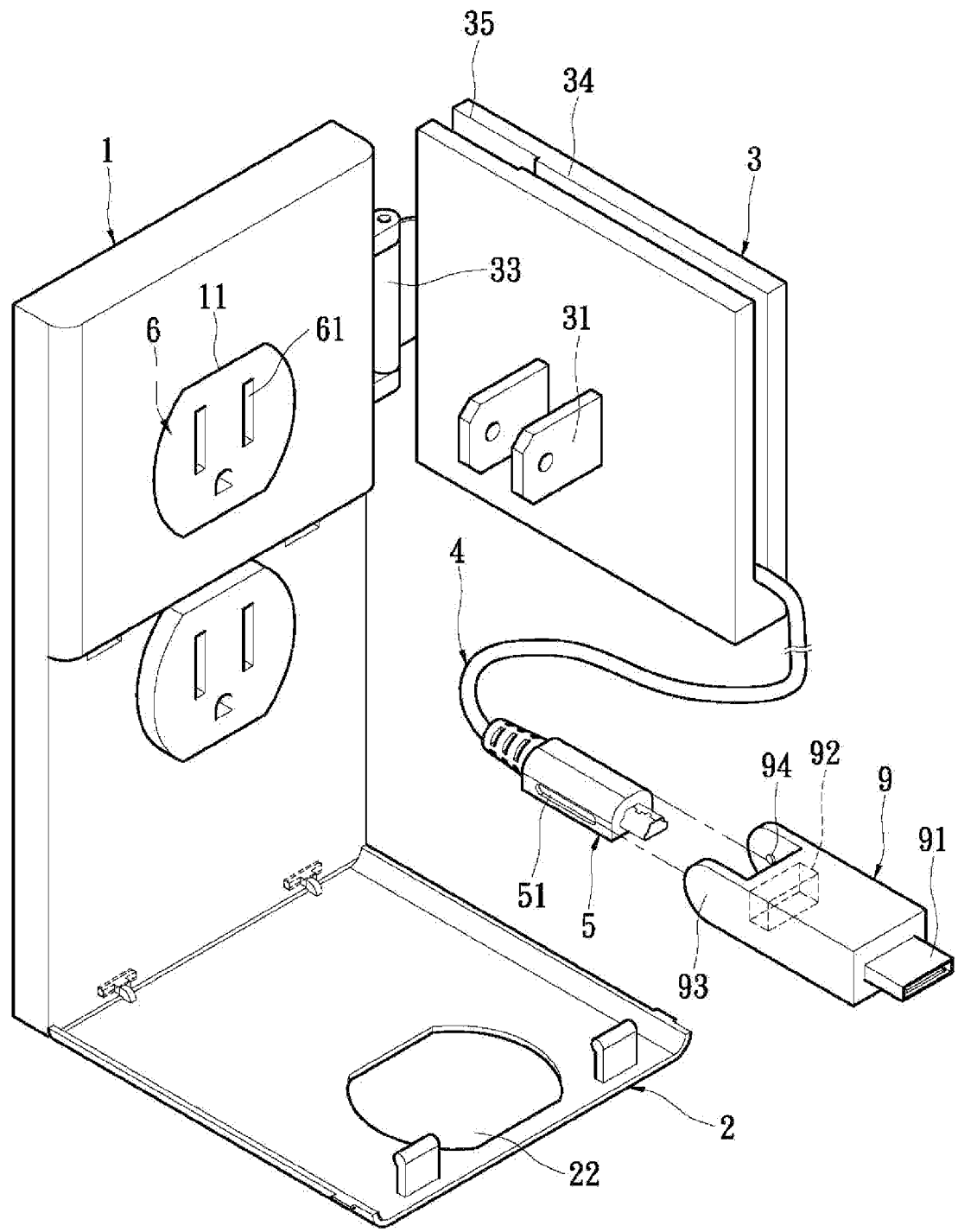
FIG. 11 is a perspective view showing the combination of a charger and a socket panel according to the eighth embodiment of the present invention.

Please refer to FIG. 11. In the eighth embodiment of the present invention, the electrical connector 5 is another kind of connector. The electrical connector 5 is further combined with an adapter 9. The front and rear ends of the adapter 9 have a first insertion element 91 and a second insertion element 92 respectively. Both sides of the adapter 9 are connected with a side arm 93 respectively. The inner surfaces of the two side arms 93 are formed with a pivoting portion 94 respectively. The pivoting portion 94 is a protruding post. The two side arms 93 can be rotary or fixed. In the present embodiment, the two side arms 93 are fixed. The two side arms 93 are fixedly combined with both sides of the adapter 9. If the side arm 93 is a rotary, the two side arms 93 can be rotatably pivoted to both sides of the adapter 9, so that the two side arms 93 can rotate. The first insertion element 91 is electrically connected to the second insertion element 92. Terminals (not shown) can be disposed between the first and second insertion elements 91, 92 to provide the electrical connection between the first and second insertion elements 91, 92.

Both sides of the electrical connector 5 are provided with a slot 51 respectively. The electrical connector 5 can move forwards and rearwards to be combined with the adapter 9. The pivoting portion 94 is received in the slot 51. Via this arrangement, the electrical connector 5 can be movably combined with the adapter 9 while the front end of the electrical connector 5 is inserted into the second insertion element 92, thereby achieving the electrical connection. In this way, the adapter 9 can be electrically connected with the connecting line 4 via the electrical connector 5.

The adapter 9 is pivotally and slidably combined with the electrical connector 5. The electrical connector 5 can rotate or slide with respect to the adapter 9. Thus, the adapter 9 is inserted into the front end of the electrical connector 5 to generate an adapting effect. When the adapter 9 is not used, it can be rotated to different orientations so that the electrical connector 5 may be used without detaching the adapter 9.

Figure 12:
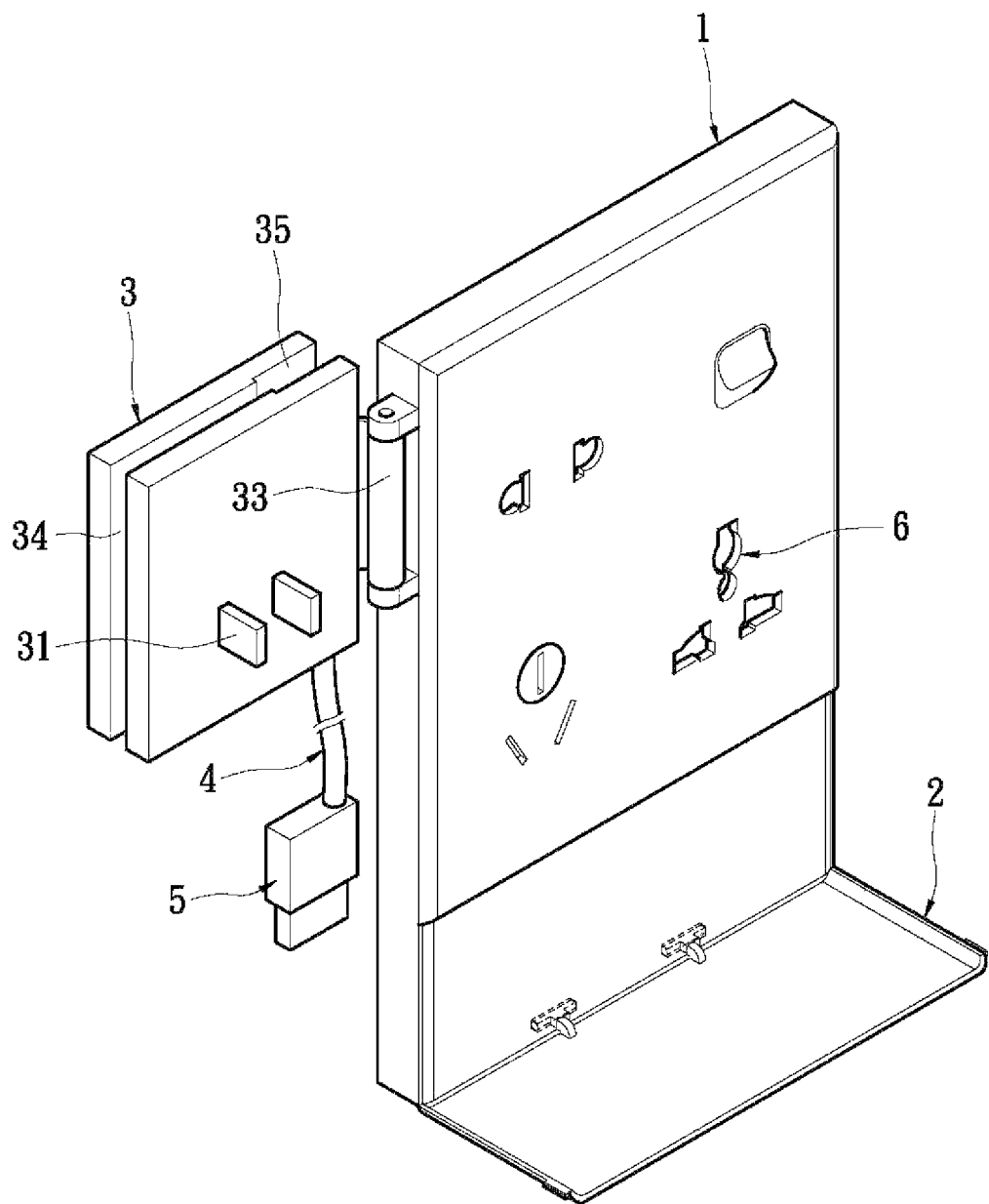
FIG. 12 is a perspective view showing the combination of a charger and a socket panel according to the ninth embodiment of the present invention.

Please refer to FIG. 12. In the ninth embodiment of the present invention, the socket unit 6 is of Mainland china standard. The socket panel 1 can be integrated with the socket unit 6 to form one unit.

Figure 13:
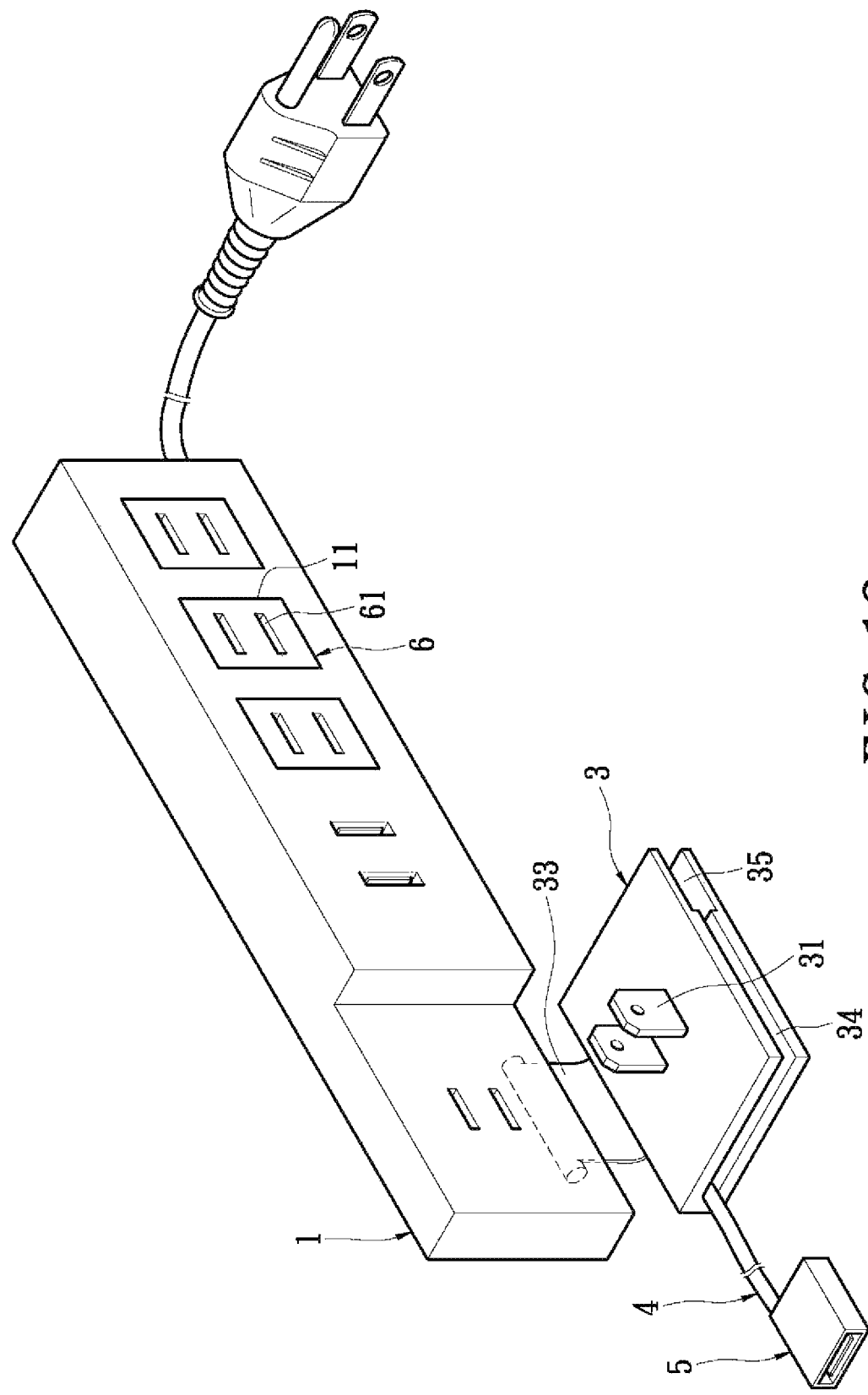
FIG. 13 is a perspective view showing the combination of a charger and a socket panel according to the tenth embodiment of the present invention.

Please refer to FIG. 13. In the tenth embodiment of the present invention, the socket panel 1 and the socket unit 6 are provided on the outlet of public power. The charger 3 can be pivoted to one side of the socket panel 1 and flip thereon. The connecting line 4 and the electrical connector 5 can be stored in the cable trough 34 and the accommodating trough 35 of the charger 3.

Figure 14:
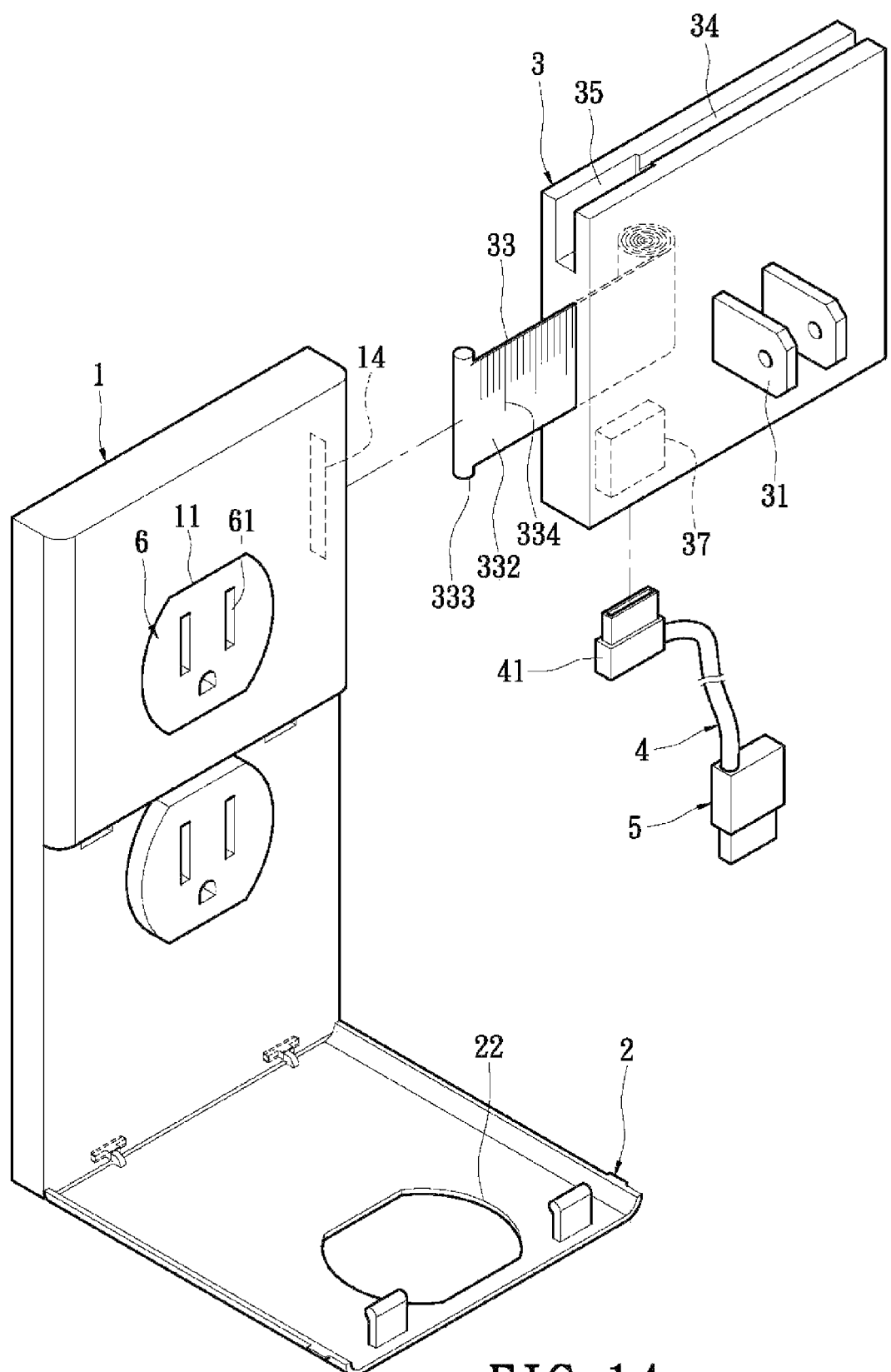
FIG. 14 is an exploded perspective view showing the combination of a charger and a socket panel according to the eleventh embodiment of the present invention.

Please refer to FIG. 14. In the eleventh embodiment of the present invention, one end of the connecting line 4 is connected with a connecting head 41. One side of the charger 3 is provided with a corresponding connecting seat 37. The connecting head 41 and the connecting seat 37 can be each a USB connector, IEEE1394 connector, HDMI connector, and various electrical connectors for AV terminals or DC terminals. The connecting seat 37 is electrically connected with the charging circuit within the charger 3. The connecting head 41 on one end of the connecting line 4 is selectively inserted into the connecting seat 37 of the charger 3, so that the connecting line 4 can be electrically connected with the charger 3 in a detachable manner.

The above-mentioned descriptions represent merely the preferred embodiments of the present invention, without any intention to limit the scope of the present invention thereto. Various equivalent changes, alternations, or modifications based on the claims of present invention are all consequently viewed as being embraced by the scope of the present invention.

What is claimed is:

1. A combination structure adapted to house a wall socket unit, the combination structure comprising:
    a socket panel configured to exposingly house the wall socket unit; and
    a charger including an inner surface having terminals electrically connectable and engageable with the wall socket unit and an outer surface formed oppositely, the charger being provided with at least one connector, the charger having a panel connecting piece disposed on an edge portion thereof,
    wherein the panel connecting piece is woundable elastically and has a reeled portion, a pivoting portion, and an extending portion connected between the reeled portion and the pivoting portion, and wherein the reeled portion is arranged in the edge portion of the charger, the pivoting portion is arranged outside the charger, and the extending portion is arranged at least partially outside the charger,
    wherein the connector is arranged on the outer surface of the charger, wherein the pivoting portion of the panel connecting piece is pivotably connected to an edge portion of the socket panel, wherein when the charger is used, the reeled portion of the panel connecting piece allows extension of the extending portion for increasing the distance between the edge portion of the charger and the edge of the wall socket unit, and the terminals of the charger are inserted into the wall socket unit by pivoting the pivoting portion of the panel connecting piece, and when the wall socket unit needs to be used, the terminals of the charger are separated from the wall socket unit by pivoting the panel connecting piece, and wherein when the wall socket unit is used, the reeled portion of the panel connecting piece allows extension of the extending portion for increasing the distance between the edge portion of the charger and the edge of the wall socket unit, and the terminals of the charger are separated from the wall socket unit by pivoting the pivoting portion of the panel connecting piece.

2. The combination structure according to the claim 1, wherein the socket panel is provided with at least one engaging portion, the engaging portion is engaged with the outer edge of at least one socket unit, the socket unit has insertion holes, the terminals of the charger are selectively inserted into the insertion holes of the socket unit.

3. The combination structure according to the claim 1, further comprising a supporting plate, the supporting plate being located on the front side of the socket panel, the supporting plate being connected to the socket panel and flipped thereon.

4. The combination structure according to the claim 3, wherein the supporting plate is provided with an open hole.

5. The combination structure according to the claim 3, wherein the bottom side of the socket panel is provided with a first pivoting portion, one side of the supporting plate is provided with a second pivoting portion, the second pivoting portion of the supporting plate is pivoted to the first pivoting portion of the socket panel.

6. The combination structure according to the claim 1, further comprising an accommodating box, the accommodating box being provided on the rear side of the socket panel, the front side of the accommodating box having an opening, the accommodating box being provided with a supporting plate sliding forwards or rearwards through the opening.

7. The combination structure according to the claim 1, further comprising a connecting line and an electrical connector, one end of the connecting line extending into the charger and being electrically connected with the charging circuit within the charger, the electrical connector being connected to the other end of the connecting line, the connecting line being wound selectively around the edge of the charger.

8. The combination structure according to the claim 7, wherein the edge of the charger is provided with a cable trough, the connecting line is selectively wound around the cable trough at the edge of the charger.

9. The combination structure according to the claim 8, wherein the edge of the charger is provided with an accommodating trough, the accommodating trough is connected to one end of the cable trough, the electrical connector is selectively received in the accommodating trough.

10. The combination structure according to the claim 7, wherein the electrical connector is further combined with an adapter, and the adapter is movably combined with the electrical connector.

11. The combination structure according to the claim 1, wherein the panel connecting piece has a spring that is wound or unwound elastically, one end of the spring is fixed to the charger, the top and bottom of the other end of the spring are provided with a shaft respectively, one side of the socket panel is provided with pivot holes corresponding to the two shafts, the two shafts are pivoted to the two pivot holes.

12. The combination structure according to the claim 1, wherein the panel connecting piece has a spring that is wound or unwound elastically, one end of the spring is fixed to the charger, the other end of the spring is formed with a shaft, one side of the socket panel is provided with a connecting hole, the shaft is pivoted to the connecting hole.

* * * * *